Nov. 9, 1965  J. DOLZA  3,216,267
ROTARY MOTION TRANSMITTING MECHANISM FOR INTERNAL
COMBUSTION ENGINES AND THE LIKE
Filed Feb. 15, 1963  2 Sheets-Sheet 1

INVENTOR.
John Dolza
BY
Barnard, McGlynn & Leising
ATTORNEYS

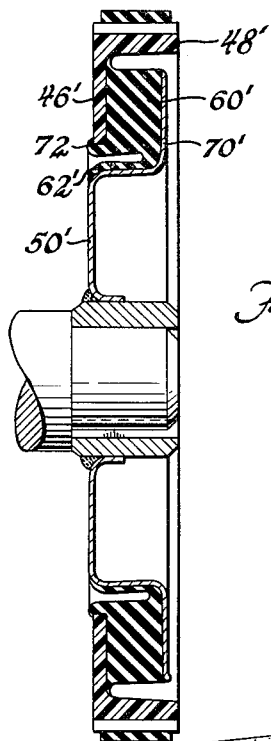
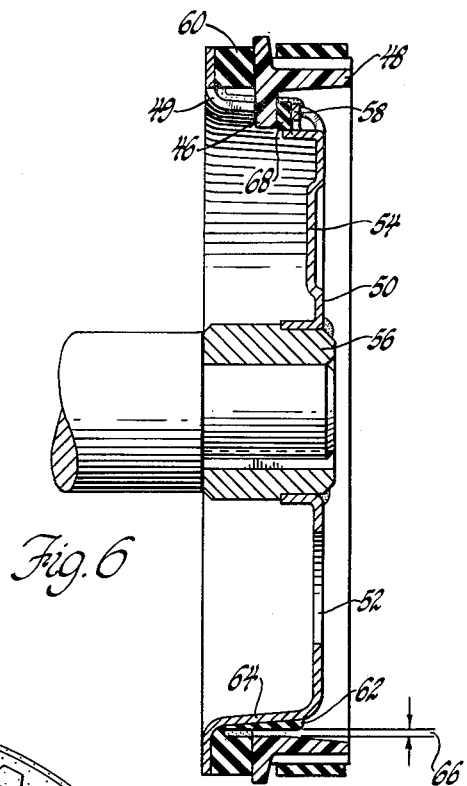
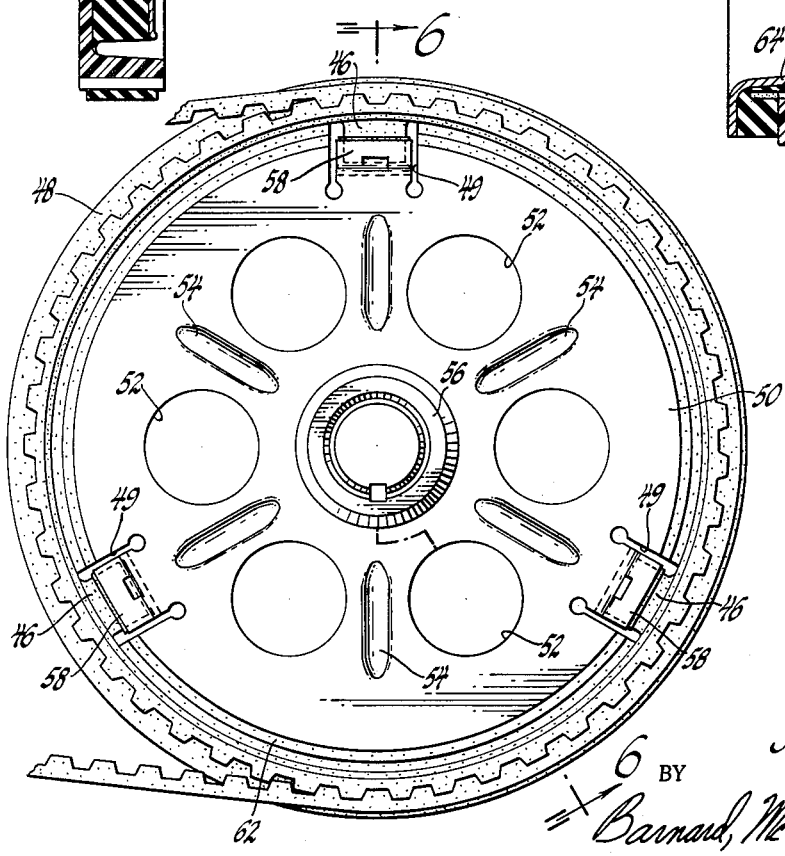
INVENTOR.
John Dolza

# United States Patent Office 3,216,267
Patented Nov. 9, 1965

3,216,267
ROTARY MOTION TRANSMITTING MECHANISM FOR INTERNAL COMBUSTION ENGINES AND THE LIKE
John Dolza, 810 State St., Fenton, Mich.
Filed Feb. 15, 1963, Ser. No. 258,763
26 Claims. (Cl. 74—219)

This invention relates to an improved mechanism for transmitting rotary motion from one rotary member to another laterally spaced rotary member. The invention has particular utility, as the connection between the crankshaft and the camshaft of an internal combustion engine, and will be described in detail with reference to this particular embodiment thereof; however, it will be understood that the improved mechanism can be used in many other devices, systems, and environments.

In all conventional reciprocating type internal combustion engines, the camshaft which imparts reciprocating motion in timed sequence to the intake and exhaust valves is driven by means of a gear on the camshaft connected by a chain to a gear on the crankshaft. It is, of course, very important that the chain connection between the gears be tight since any slack in the chain leads to torsional oscillation of the camshaft, timing variations and valve mechanism noises. If slack is excessive, whipping of the chain with associated gear tooth wear can result, along with the hazard that the chain will disengage from the gears. Because of the inevitable slight variations in chain and gear sizes and in gear spacing resulting from normal manufacturing tolerances, it is difficult if not impossible to acomplish the chain tautness required without incorporating some special means or mechanism for this purpose.

This problem of maintaining a taut chain or drive connection between the gears is further complicated by the fact that the crankshaft and the camshaft are mounted to a common support, to wit, the engine block, and as the engine temperature fluctuates, as from a cold engine to a hot engine, the lateral spacing between the shafts undergoes variation due to metal expansion and contraction. Hence, while the chain connection might be taut when the engine is hot, it would normally become slack when the engine is cool due to slight contraction of the engine block.

One obvious solution to the problem would be to use an elastic chain instead of one of fixed length such that its inherent elasticity would maintain it taut at all times. However, this is disadvantageous for the reason that an elastic chain inherently lacks various essential properties and, most importantly, an inability to maintain a proper angular velocity relationship between a driving and driven member. The stock solution to the problem, which is in common use at the present time, is to use an idler gear or other tensioning means which biases against the chain to maintain it taut. This has two disadvantages. First, it increases the noise produced by the mechanism during engine operation, since with each additional gear-to-chain connection the noise level becomes greater. Secondly, it is expensive because it requires additional, relatively costly parts.

A fundamental objective of this invention is the provision of a mechanism for transmitting drive between a pair of rotary members mounted on generally parallel but laterally offset shafts wherein variations in the lateral distance between shafts may be accommodated without introducing torsional oscillations or variations between the rotary members. In other words, the present mechanism provides a rotary motion transmitting drive train in which there is substantially no torsional wrap-up or relative torsional movement between rotary members while permitting variations in the lateral displacement in the rotative axes of such members.

A further and specific object is the provision of an improved and simplified mechanism for transmitting rotary motion from the crankshaft to the camshaft so as to maintain proper valve timing even though the lateral distance between said shafts may vary. Still another object is the provision of an improved rotary member particularly useful in rotary motion transfer mechanisms in which lateral distances between coacting rotary axes are variable.

Briefly, these objects are accomplished by constructing one or both of the gears or other rotary members with a hub, a rim, and resilient means connecting the hub and rim such that an eccentric relationship can exist between the hub and the rim. Hence, an extremely strong non-elastic chain can be used and without need for a chain biasing idler gear mechanism. The resilient connection between the hub and rim maintaining the chain taut at all times irrespective of slight variations in the spacing between the axes of rotation of the gears.

The above and other objects, advantages, and features of the invention will appear more clearly from the following detailed description of preferred embodiments thereof made with reference to the appended drawings in which:

FIGURE 6 is a sectional view through a modified form of hub-rim construction taken along line 6—6 of FIGURE 7; and FIGURE 7 is an elevational view of the modified form of hub-rim constructions.

FIGURE 8 is a modified form of the invention.

Figure 1:
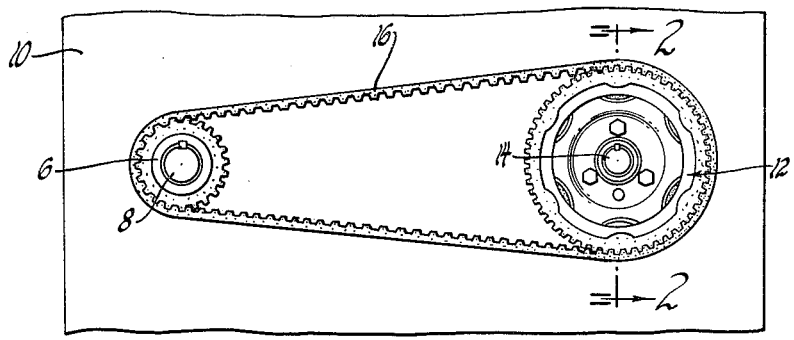
FIGURE 1 is a front view of an embodiment of the invention showing a relatively small driving gear connected to the crankshaft of an engine, a large driven gear connected to the engine camshaft, and a chain or belt connection between the two.

Referring now to FIGURE 1, the mechanism shown comprises a relatively small driving gear 6 secured to the end of crankshaft 8 which is rotatably supported by the metal engine block indicated at 10, a relatively large driven gear 12 secured to the end of the camshaft 14 which extends parallel to the crankshaft and which is also rotatably supported by the metal engine block 10, and a taut strong non-elastic continuous chain or belt 16 engaging and interconnecting the driving and driven gears to transmit the rotary motion of the one to the other. Since the chain can be of substantially fixed length, requiring no elasticity, its construction should preferably be such as to provide optimum tensile strength. In the embodiment shown, the chain is formed of a cloth-organic polymer laminated material with the teeth molded therein and with imbedded continuous strands of metal wire or glass fiber to impart the high tensile strength. Such a chain has the advantage of being relatively noiseless as compared to a metal link chain.

Figure 2:
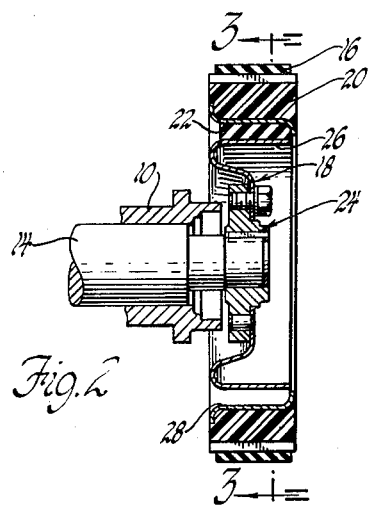
FIGURE 2 is a sectional view taken on the line 2—2 of FIGURE 1 but in larger scale.
Figure 3:
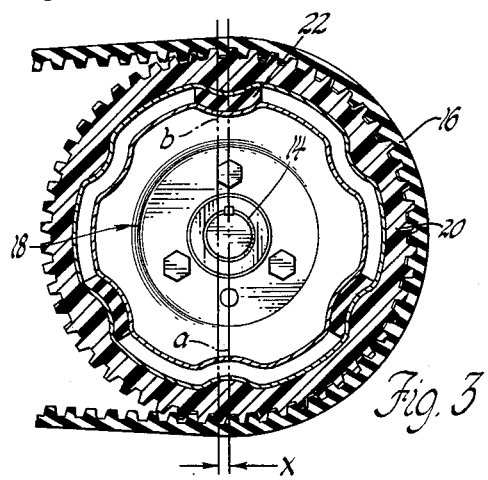
FIGURE 3 is a view of the camshaft or driven gear of FIGURE 1 taken on the line 3—3 of FIGURE 2.

Referring now in particular to the form of invention shown in FIGURES 2 and 3, the driven gear 12 comprises a hub 18 which is keyed to the camshaft 14, and a rim 20 which has its outer periphery formed with gear teeth in engagement with the chain 16, and which is secured to the hub by three equally circumferentially spaced blocks of rubber 22 which serve as the resilient connection between the hub and the rim. In the particular embodiment shown, and for purposes of economical manufacture, the hub 18 is formed by a metal casting 24 and a generally annular shaped pressed sheet metal member 26, having an outer flange extending parallel to the axis of rotation and secured to the casting as by the bolts shown. Likewise, the rim may be formed of two parts, the outer gear toothed part may be of a plastic material, and an inner mating sheet metal part 28. In manufacture, the rubber blocks 22 are secured to the inner surface of rim part 28 and the outer surface of the hub stamping 26 by vulcanizing the rubber to the metal or by other rubber-to-metal bonding techniques such as adhesives well known in the art, after which the bonded subassembly can be secured to the remaining gear parts.

It is desirable that the resilient connection between the hub and rim portions be such as to have a high angular rigidity while permitting radial flexibility. The need for high angular rigidity is dictated by the fact that it is desirable to limit angular movement of the rim with respect to the hub either in the plane of the gear or in a plane perpendicular to that of the gear. I have found that for the mechanism shown, i.e., an engine crankshaft-to-camshaft connection, neoprene having a durometer resiliency of about 30 to 50, is eminently satisfactory as the resilient connection between the hub and the rim through vulcanized natural rubber or any of the well known synthetic elastomer stocks such as Buna-N, of similar resiliency, may be used if desired. To assist in accomplishing a high angular rigidity while permitting radial flexibility, it is desirable that the resilient connection be adjacent the outer periphery of the gear and therefore spaced as far as practical from the center of rotation. Further, the outer surface of the hub and the inner surface of the rim of the FIGURE 1–3 embodiment are provided a somewhat sinuous shape such that there are mating or radially aligned relatively short radius arcuate rises and depressions between the rim and the hub between which the resilient rubber blocks 22 are secured as shown. Such structure further tends to inhibit shear of the rubber in the plane of the gear and hence assists in limiting angular movement or wind-up of the hub with respect to the rim, and this without any adverse effect on the elasticity of the rubber in radial compression and tension. Also, it will be noted that the dimension of each rubber block in the direction of rotation of the gear, as shown in the FIGURE 3 section, and the dimension parallel to the axis of rotation of the gear, as shown in the FIGURE 2 section, are both greater than the dimension in the direction of the radius of the gear.

As assembled, the rotative axis $a$ of hub 18 is offset from the rotative axis $b$ of rim 20 an initial amount $x$. The minimum $x$ is determined by pretensioning the chain to approximately the maximum tangential pulsating force introduced into the chain by the engine operation and frequency. For instance, and with a particular engine, fifty pounds of pre-load between member 6 and 12 will equal or exceed slightly the maximum tangential force required to overcome the peak torque reaction of the cam on the camshaft 14. Unless such pretensioning of member 12 is undertaken, the pulsating tangential force which is variously introduced into chain 16, would start member 12 "bouncing."

The axis offset $x$ is in the direction of thermal expansion as block 10 becomes heated. In other words, as the engine heats, camshaft 14 moves away from crankshaft 18 and the distance $x$ will become larger increasing the eccentricity. At the same time, due to the essential non-elasticity of belt or chain 16, rim 20 will remain in its same spatial relationship with respect to drive gear 6. Thus, it is found to be preferable to assemble the mechanism with the blocks 22 prestressed to provide an initial eccentricity between hub 18 and rim 20. This initial and controlled eccentricity insures that the direction of eccentricity is always the same even though the magnitude may vary. This relationship further enhances stability of the drive system including its ability to transmit drive between members 6 and 12 without torsional oscillations.

Accordingly, during operation each resilient block 22 is slightly compressed when it is angularly oriented in a position furthest away from the drive gear and is under slight tension when it is oriented in an angular position closest to the drive gear. I have found that while the resilient connection permits this eccentricity between the hub and the rim by reason of the compression-tension resiliency of the rubber, there is no substantially wind-up or angular movement of the hub with respect to the rim nor is there any tendency for the rim to move out of the plane of the hub. The overall result, therefore, is that the chain remains taut at all times, thereby providing a low noise level, trouble-free and relatively inexpensive tight connection for transmitting the rotary motion of the driving gear to the driven gear.

Figure 4:
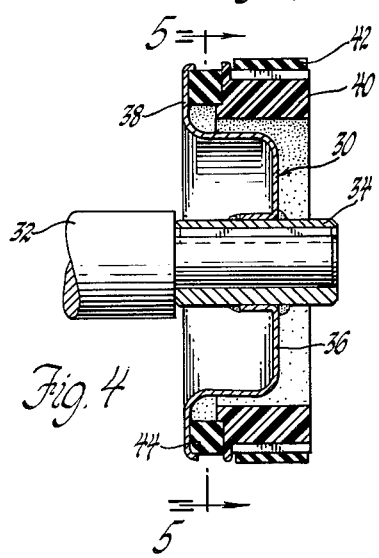
FIGURE 4 is a side view in section of one of the gears of another embodiment of the invention.
Figure 5:
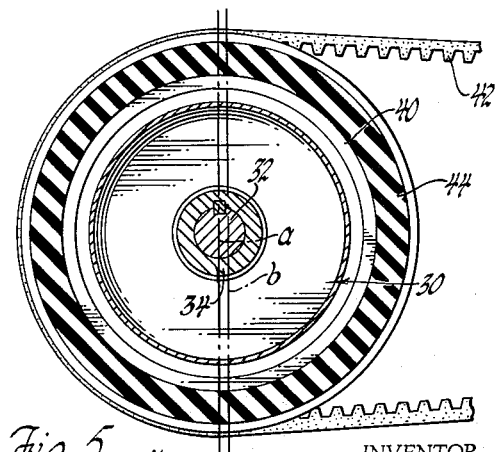
FIGURE 5 is a view taken on the line 5—5 of FIGURE 4.

FIGURES 4 and 5 show a preferred embodiment of the invention which is subtantially the same as that shown in FIGURES 1–3, except for the structure of the driven gear. Referring now to FIGURES 4 and 5, the driven gear comprises a generally cup shaped hub 30 which is keyed to the camshaft 32, the hub being formed by a metal sleeve 34 and an annular stamped metal member 36 having its inner surface shaped as a flange which is secured to the sleeve 34, as by welding, and having its outer periphery shaped as a radially outwardly extending flange 38. The rim 40, which has its outer surface formed with teeth for engagement with the chain 42, telescopes over the cup shaped hub with one of its side surfaces in opposed spaced relationship to the hub flange 38. A continuous ring of neoprene 44, having a durometer resiliency of about 40, is bonded to the flange 38 and to the rim 40 and hence provides the resilient torque transmitting connection therebetween. It will be noted that the rubber ring connection is located adjacent the outer periphery of the gear. This enables the use of a relatively large rubber ring and hence reduces the resiliency of the connection as regards undesirable angular movement between the hub and the rim. Also, because the resilient connection is located close to the gear's outer periphery, it is subjected to less torque and there is, therefore, less tendency for the hub to wind-up with respect to the rim.

Operation of the FIGURE 4–5 embodiment is the same as that of the FIGURE 1–3 embodiment, the resilient connection 44 between the hub and the rim permitting the hub to have an initial eccentricity with respect to the rim and which eccentricity will increase due to lateral displacement of the camshaft with respect to the crankshaft as the engine block heats.

FIGURES 6 and 7 show a further preferred embodiment of the invention which is substantially the same as that shown in FIGURES 4 and 5 except for the addition of lugs 46 to the inside portion and extending in from the rim 48 at three equally spaced points. Lugs 46 extend through openings 49 in hub 50. The cup shaped hub 50 is also modified to incorporate lightening holes 52 and strengthening ribs 54 each equally spaced and each six in number. The use of lightening holes also tends to act as a heat dam against thermal conductivity transmitted from the engine via shaft 32, hub 56, and cup stamping 50 preventing imparting excessive heat to the elastomer 60.

In addition, the stamped cup 50 has incorporated at its outer periphery three tabs 58 formed as a part of the stamping. Hub openings 49 have a width sufficient to provide a clearance on either side of the lugs 46 which extend therethrough and will limit the radial motion between hub and rim in case of failure of the elastomer 44.

The tabs 58 also, when in the assembled position (as shown in FIGURE 6) will, in case of failure of the elastomer 44, prevent the rim 48 from axially separating from cup 50.

An additional lip 62 may be formed on elastomer 60 and secured to portion 64 of stamped cup 50. Clearance 66 from the inside of the rim 48 to the outside periphery created by lip 62 is equal to the amount of maximum eccentricity acceptable to maintain tooth engagement between rim 48 and chain 42. The incorporation of this feature gives a safety limit to prevent excessive eccentricity whereas the belt could disengage from its specified groove or grooves. On an application where timing must be maintained, e.g. automative camshaft, the chain must not be allowed to jump or disengage thereby changing the timing. The limit on eccentricity will also be effective in dampening excessive belt vibrations and tangential forces.

In addition to the natural dampening characteristics of the elastomer 60, a frictional dampening member 68 can be added when required for higher speed or higher load operation. Member 68 is a block of friction material which will in effect reduce the resilience as regards relative radial movement between rim and hub. The friction member 68 is made of any frictional material acceptable for durability and proper friction coefficient and is preferably clipped or cemented to hub 50. Member 68 would normally engage lugs 46 through the resilience of tabs 58. The spring loading by tabs 58 will also place elastomer 60 under some pre-load which is an effective method for increasing the durability of the system.

In all cases the mass of the rim member is maintained as low as possible to permit first, the use of a low radial rate elastomer (considered as a spring) and, second, a rim frequency in excess of the natural system excitation frequency. In an internal combustion engine excitation frequencies are caused in the camshaft by the reaction forces resulting from operating the valve mechanisms. An excitation frequency is also created by intermittent engine firing.

FIGURE 8 is a modification of the invention as shown in FIGURE 6 whereby the width of the flexible hub may be reduced by disposing the annular elastomeric ring 60' concentrically within rim 48' as suggested by the modification of FIGURE 2. In this case, the stamped hub 50' is longitudinally offset to provide a flange portion 70 corresponding to and spaced from inwardly extending radial flange 46' formed on rim 48'. The radial faces of ring 60' are respectively bonded to hub and rim flanges 70 and 46'.

An annular lip 72 is formed on ring 60' and is also bonded around the inner edge of hub flange 46' to further secure the ring to the hub. Lip 72' corresponds to lip 62 of FIGURE 6 and limits the eccentricity between the rim and hub, supra.

It will be understood that other resilient means may be used between the hub and the rim in place of the elastomer material shown and described, though the elastomer connection is preferred. For example, the resilient means may comprise metal springs as covered by U.S. patent application No. P-305 in the name of Sergio Angelini and assigned to the present inventor, and U.S. patent application No. P307 in the name of the present inventor. Further, and as has been previously mentioned, it will be understood that the invention can take other forms and be used in different environments. For example, the rotary members and the means interconnecting them can be other than as shown and described. Illustrative of this would be the use of pulleys instead of gears and the use of a belt of V-shaped or other cross section in place of a chain to interconnect the pulleys. Also illustrative of the applicability of the invention in its broader scope would be its use in a gear train, i.e., where the connection between a driving gear and a laterally spaced driven gear is formed by one or more intermediate meshing gears. By constructing either the driven or the driving gear with a resilient connection between the hub and rim as described herein, there can be assurance of a tight meshing of the gears, irrespective of slight differences in lateral spacing between the drive and driven shafts, the rim and hub being in slightly eccentric relationship while the shafts are relatively close to each other, and generally concentric while the shafts are relatively far apart. In all instances where one of the rotary members is larger than the other, it is desirable that the resilient connection be incorporated in the larger of the two since it then permits the connection to be spaced further radially from the axis of rotation, which is desirable for reasons previously mentioned; however, it will be understood that the resilient connection can be incorporated in the smaller of the rotary members or in both of them. Hence, while the invention has been described in detail specifically with reference to certain preferred embodiments thereof, various changes and alterations may be made all within the full and intended scope of the claims which follow.

I claim:

1. An internal combustion engine having a crankshaft, a camshaft spaced from and generally parallel to the crankshaft, a gear connected to the crankshaft, a gear connected to the camshaft, and a continuous chain of substantially fixed length interconnecting said gears to transmit the rotary motion of the one to the other, at least one of said gears having a hub, a rim, and a resilient connection between the hub and the rim to permit the rim to rotate with the hub and eccentrically relative to the hub and thereby allow for any variation in the spacing between the driveshaft and the camshaft.

2. An internal combustion engine as set forth in claim 1 wherein the resilient connection between the hub and the rim is formed by an elastomer material.

3. An internal combustion engine as set forth in claim 1 wherein the resilient connection is formed by a ring of elastomer bonded between the hub and the rim adjacent the outer periphery of the gear.

4. A rotary motion transmitting mechanism comprising a first rotary member, a second rotary member with its axis of rotation spaced from that of the first rotary member, and means interconnecting said rotary members to transmit the rotary motion of the one to the other, at least one of said rotary members having a hub, a rim, and a resilient connection between the hub and the rim to permit rotation of the rim with the hub and eccentrically of the hub during rotation thereof.

5. A rotary motion transmitting mechanism comprising a first rotary member, a second rotary member with its axis of rotation spaced from that of the first rotary member, and means interconnecting said rotary members to transmit the rotary motion of the one to the other, at least one of said rotary members having a hub, a rim, and at least one body of elastomer material between the hub and the rim to serve as a resilient connection therebetween and thereby permit the rim to rotate with the hub and about an axis spaced from the axis of the hub during rotation thereof.

6. A rotary motion transmitting mechanism as set forth in claim 5 and wherein said elastomer body comprises a ring-shaped body of elastomer material.

7. A rotary motion transmitting mechanism comprising a first rotary member, a second rotary member with its axis of rotation spaced from that of the first rotary member, and a closed flexible loop of substantially fixed length interconnecting said rotary members to transmit the rotary motion of the one to the other at least one of said rotary members having a hub, a rim, and a resilient connection between the hub and the rim, to permit rotation of the rim with the hub and eccentrically of the hub.

8. A rotary motion transmitting mechanism comprising a large rotary member, a small rotary member with its axis of rotation spaced from that of the large rotary member, and means interconnnected said rotary members to transmit the rotary motion of the one to the other, said large rotary member having a hub, a rim, and a resilient connection between the hub and the rim and adjacent the periphery of said large rotary member to permit rotation of the rim with the hub and eccentrically thereof.

9. A rotary motion transmitting mechanism comprising a first rotary member, a second rotary member with its axis of rotation spaced from that of the first rotary member, and a closed flexible loop of substantially fixed length interconnecting said rotary members to transmit the rotary motion of the one to the other, at least one of said rotary members having a hub, and a rim, said hub and said rim having radially opposed arcuate rises and depressions therein and an elastomer material between and bonded to said opposed surfaces to provide a resilient connection between said hub and said rim and thereby permit relative eccentric rotation therebetween.

10. A rotary motion transmitting mechanism as set forth in claim 9 wherein said elastomer material comprises a plurality of circumferentially spaced elastomer blocks, each located between an aligned rise and depression in the opposed surfaces of said hub and said rim.

11. A rotary motion transmitting mechanism comprising a first rotary member, a second rotary member with its axis of rotation spaced from that of the first rotary member, and a closed flexible loop of substantially fixed length interconnecting said rotary members to transmit the rotary motion of the one to the other, at least one of said rotary members having a hub with a radially outwardly extending flange, a rim with a side surface in opposed spaced relationship to the flange on said hub, and a body of elastomer material bonded to said flange and to the side surface of said rim to form a resilient connection between said hub and said rim and thereby permit relative eccentric rotation therebetween.

12. A rotary motion transmitting mechanism comprising a first rotary member connected to a shaft, a second rotary member connected to a second shaft parallel to and spaced from said first mentioned shaft, both of said shafts being rotatably supported by a common support which is subject to expansion due to temperature fluctuations, and means interconnecting said rotary members to transmit the rotary motion of the one to the other, said means preventing any increase in the spacing between the outer peripheries of said rotating members, at least one of said rotary members having a hub, a rim, and a resilient connection between the hub and the rim, to permit rotation of the rim with the hub and eccentrically thereto and thereby allowing for variation in the spacing between the shafts due to expansion of the support.

13. A rotary member comprising a hub, a rim, and a resilient connection between the hub and the rim, said resilient connection permitting the hub to assume an eccentric position with respect to the rim during normal operation of said rotary member while inhibiting angular movement of the hub with respect to the rim.

14. A rotary member as set forth in claim 13 wherein the resilient connection is a ring of elastomer material bonded between a side surface on said rim and a radially outwardly extending flange on said hub.

15. A rotary member comprising a hub having a rotative axis, a rim having a rotative axis, and a resilient connection between said hub and said rim permitting one axis to assume an eccentric and parallel relationship to the other axis and inhibiting relative rotation between hub and rim and relative angular movement of the hub relative to the rim.

16. A rotary member as set forth in claim 15 in which the resilient connection between hub and rim causes a restoring force to be produced when the rotative axis of the rim is displaced from the rotative axis of the hub.

17. A rotary member as set forth in claim 16 in which the mass of the rim is related to the restoring force rate of the resilient connection between said hub and said rim to result in a natural frequency of the system greater than the system excitation frequencies.

18. A rotary member adapted to be driven by a pulsating force and which member comprises a hub having a rotative axis, a rim having a rotative axis, and a resilient connection between said hub and said rim permitting one axis to assume an eccentric and parallel relationship to the other axis and inhibiting relative rotation between the hub and the rim and relative angular movement between hub and rim, the restoring force in the resilient connection resulting from the eccentricity between the hub and rim being greater than the pulsating force driving the rotary member.

19. A rotary motion transmitting mechanism comprising a first rotary member, a second rotary member with its axis of rotation spaced from that of the first rotary member, and a closed flexible loop of substantially fixed length interconnecting said rotary members to transmit the rotary motion of the one to the other, at least one of said rotary members having a hub with a radially outwardly extended flange, a rim with a side surface in opposed spaced relationship to the flange on said hub, and a body of elastomer material bonded to said flange as well as extending along and around the outside cup periphery and the side surface of said rim to form a resilient connection between said hub and said rim and thereby permit eccentricity therebetween during rotation thereof, said hub and rim including axially extending surfaces in an opposed and radially spaced relationship, said elastomer including at least a portion thereof secured to at least one of said surfaces and leaving a radial space therebetween to limit the amount of eccentricity between the rim and hub.

A rotary motion transmitting mechanism comprising a first rotary member, a second rotary member with its axis of rotation spaced from that of the first rotary member, and means interconnecting said rotary members to transmit the rotary motion of one to the other, at least one of said rotary members having a hub, a rim, and a plurality of circumferentially spaced elastomer blocks between the hub and the rim to serve as a resilient connection therebetween and thereby permit the rim to rotate with the hub and about an axis spaced from the axis of the hub during rotation thereof.

21. A rotary member comprising a hub, a rim, and a plurality of equally spaced circumferentially arranged elastomer blocks, each of said blocks being bonded between opposed relatively short radius arcuate surfaces on said hub and said rim, said elastomer blocks permitting the hub to assume an eccentric position with respect to the rim during normal operation of said rotary member while inhibiting angular movement of the hub with respect to the rim.

22. A rotary member comprising a hub, a rim, and a resilient connection between the hub and the rim, said hub including a wall portion having a plurality of circumferentially spaced openings, a plurality of radially inwardly extending lugs formed on said rim and extending through said openings to limit relative rotation between the rim and the hub, said openings being wider than said lugs to provide a circumferential clearance therebetween, and said resilient connection permitting the hub to assume an eccentric position with respect to the rim during normal operation of said rotary member while inhibiting angular movement of the hub with respect to the rim.

23. A rotary motion transmitting mechanism as set forth in claim 22 in which a radially outwardly extending tab is formed on said hub adjacent each opening and juxtaposed in axial alignment with a corresponding rim lug.

24. A rotary motion transmitting mechanism as set forth in claim 23 in which a friction material is disposed between each of said lugs and hub tab and secured to one of said last named members whereby said material will dampen oscillations between said rim and hub.

25. A rotary motion transmitting mechanism as set forth in claim 24 in which said fraction material is secured to said hub tab and is urged to abutting engagement with the associated rim lug by said tab.

26. A rotary motion transmitting mechanism as set forth in claim 25 in which said hub tabs are formed to provide an axial spring bias in the direction of said rim lugs whereby said frictional material and said elastomer are placed under an axial compression load by said tabs.

References Cited by the Examiner

UNITED STATES PATENTS

| | | | |
|---|---|---|---|
| 1,043,012 | 10/12 | Hudson | 74—443 |
| 2,060,565 | 11/36 | Geyer | 64—27 |
| 2,671,488 | 3/54 | Christensen | 64—27 |
| 2,766,634 | 10/56 | Frank | 74—240 |
| 2,885,870 | 5/59 | Jaklitsch | 64—11 |

FOREIGN PATENTS 682,196  11/52  Great Britain.

DON A. WAITE, *Primary Examiner.*

UNITED STATES PATENT OFFICE
CERTIFICATE OF CORRECTION

Patent No. 3,216,267 November 9, 1965

John Dolza

It is hereby certified that error appears in the above numbered patent requiring correction and that the said Letters Patent should read as corrected below.

Column 6, line 71, for "interconnected" read -- interconnecting --; column 8, line 21, after "and" insert -- to --; line 30, for "A rotary" read -- 20. A rotary --; same column 8, line 73, for "fraction" read -- friction --.

Signed and sealed this 19th day of July 1966.

(SEAL)
Attest:

ERNEST W. SWIDER
Attesting Officer

EDWARD J. BRENNER
Commissioner of Patents